Patented May 19, 1936

2,040,905

UNITED STATES PATENT OFFICE 2,040,905

SOLVENT MATERIAL FOR ABSORPTION REFRIGERATING MACHINES

Glenn F. Zellhoefer, Bloomington, Ill.

No Drawing. Application April 20, 1934,
Serial No. 721,549

1 Claim. (Cl. 252—5)

This present invention relates generally to solvent materials for absorption refrigerating machines, and particularly to the type of solvent material for the so-called "two-fluid machines", wherein there is a solvent material adapted to remain liquid throughout the operation of the refrigerator, and a refrigerant material adapted to have a liquid and a vapor phase in the cycles of operation, and adapted to be dissolved in the solvent.

Numerous refrigerants and solvents, and numerous combinations are known. A number of published articles are known which deal with a listing of refrigerants, and a listing of solvents. These publications appear to be based upon knowledge of certain successful combinations of a solvent and a refrigerant. On the basis of success in these combinations, certain conclusions are drawn, and it is predicted that other combinations of the listed materials may be made.

However, to one skilled in the art and having knowledge of other properties of the listed materials not considered in these publications, and a knowledge of practical considerations, it is obvious that the predictions cannot be relied upon, and that many combinations are not operable, or if operable, are not practical, and could not be successfully used in commercial refrigerating systems.

The present invention relates to solvents for the refrigerant methyl chloride. Although there are many solvents apparently available from the listings refererred to, there is no differentiation of them for particular refrigerants. When I adhere to one material as a refrigerant, namely, methyl chloride, I am able to carry out certain tests which will determine the suitability of a given substance as a solvent for it. By numerous tests and experiments I have been able to set limitations which determine whether a solvent is a suitable one for successful practical use with methyl chloride.

As a result of the limitations and the tests, I have discovered that certain compounds containing the ether group $\equiv$C—O—C$\equiv$ have distinctive combinations of properties tending to make them a new class in which one is quite certain to find a practical refrigeration solvent for methyl chloride. However, I have discovered that every such compound is not suitable, for one reason or another.

An example of an apparatus in which the new materials have been successfully employed is described in my Patent No. 1,895,698, January 31, 1933.

Briefly described, the apparatus specifically referred to comprises a still in which a mixture of solvent and refrigerant is heated to vaporize the refrigerant from the solution, a condenser wherein the vapor is condensed to a liquid state, an evaporator wherein the liquid is vaporized at reduced pressure, such evaporator being the effective cooling means, such as coils, in the apparatus, and an absorber in which vapors containing added heat units are again dissolved in the solvent. Suitable heat exchanging and circulation means are included, and automatic controls may be provided.

The particular characteristics of such machines are that the still operates at temperatures well above normal temperatures against which the refrigeration acts, such for example at 210° F.; and that the cooling unit operates at temperatures much lower than normal, such as from 5° F. to 40° F. Various parts of the apparatus differ in the prevailing pressures as well as temperatures and both pressure and temperature determine the physical state of the free refrigerant, whether gaseous or liquid, and determine the solubility relations between the refrigerant and the solvent. It is, therefore, very important that the solvent and the refrigerant be physically adapted for use as individual materials in certain places and for certain functions, and that they be mutually adapted for certain functions when they are in combination. Other qualities not essential to refrigeration, but pertinent to practical usage, control or limit the choice of solvent or refrigerant, such as odor, viscosity, heat capacity, boiling point, freezing point, volatility, chemical stability, reactivity, corrosive action, inflammability, toxicity, etc.

By reason of the limitations which I have discovered and have herein set forth, I have been able to divide compounds containing the structure $\equiv$C—O—C$\equiv$ into one group which is suitable and into another group which is unsuitable. I have also found that although there are such compounds found in the prior art listings above alluded to, these fall into the unsuccessful group when tested by the limitations which defines the successful group of ethers constituting the present invention.

In defining the compounds I intend to include compounds in which the ether type of structure is found, namely,

that is, an oxygen atom connected to two carbon atoms. It permits of the two carbon atoms being otherwise unlinked, being linked directly together, or being members of a ring structure through linkages beyond the immediate carbon atoms. The compounds falling within the scope of this invention may vary greatly in the composition beyond the essential grouping above described, as will appear hereinafter.

In practical usage the solvent may exist substantially alone, and also in varying proportion in admixture with methyl chloride. It is subjected to varying temperatures and pressures within certain normal working ranges. Since the solvent is used for dissolving, containing, and discharging methyl chloride with respect to the vapor phase of the latter, the temperature and pressure are conjointly material to successful operation. Since there is flow of liquid in pipe-like apparatus, the viscosity is pertinent. Since the solvent must contact metal structures, chemical activity is important. Stability of the solvent is necessary for commercial life of the refrigerator unit, and this must be considered both in regard to its inherent stability, and its stability in contact with metals, with the methyl chloride, and with traces of water or water vapor which might be present.

The differential solvent power of the ether for methyl chloride is material for determining an overall proportion in the unit between solvent and refrigerant, for economical construction and operation of the unit.

From my various studies and experiments I have determined that the ethers falling within this invention must comply with all of the following specifications:

1. *Viscosity.*—Not over 10.0 centipoises at 25° C. (77° F.).
2. *Boiling point.*—Not under 270° F. (132° C.) at 760 mm.
3. *Freezing point.*—Not over 10° F. (−12° C.).
4. *Stability and activity.*—Must be chemically stable and inert at or below 270° F. (132° C.) in the presence of methyl chloride, iron, steel, copper, bronze, brass, and moisture.
5. *Solvent power for methyl chloride.*—There must be a minimum of 0.14 gm. per cc. difference in solubilities at 30 lbs. pressure at 90° F., and at 90 lbs. pressure at 230° F.

I have applied these tests to the following solvents, and have also used the materials in combination with methyl chloride in a two-fluid unit of the kind above described, finding all of them satisfactory for commercial usage.

| Compound | Formula |
|---|---|
| BB' dichloroethylether | $ClCH_2CH_2-O-CH_2CH_2Cl$ |
| Dichloroisopropyl ether | $CH_3CH-CH_2Cl$ / $O$ / $CH_3CH-CH_2Cl$ |
| Dichloropropyl ether | $ClCH_2CH_2CH_2-O-CH_2CH_2CH_2Cl$ |
| Ethylene glycol mono-butyl ether | $CH_3(CH_2)_3-O-CH_2CH_2OH$ |
| Diethylene glycol mono-butyl ether | $CH_3(CH_2)_3-O-CH_2CH_2OCH_2CH_2OH$ |
| Acetate of mono-butyl ether of ethylene glycol | $CH_3(CH_2)_3OCH_2CH_2O-COCH_3$ |
| Acetate of diethylene glycol mono-butyl ether | $CH_3(CH_2)_3OCH_2CH_2OCH_2CH_2OCOCH_3$ |
| n-butyrate of the mono-n-butyl ether of ethylene glycol | $CH_3(CH_2)_3OCH_2CH_2OCO(CH_2)_2CH_3$ |
| Methoxyacetate of the mono-n-butyl ether of ethylene glycol | $CH_3(CH_2)_3OCH_2CH_2OCOCH_2OCH_3$ |
| Diethylene glycol mono-butyl ether chloride | $CH_3(CH_2)_3OCH_2CH_2OCH_2CH_2Cl$ |
| Dimethyl ether of triethylene glycol | $CH_3-O-CH_2CH_2-O-CH_2CH_2-O-CH_2CH_2-O-CH_3$ |
| Acetate of ethylene glycol mono-tetrahydrofurfuryl ether | (tetrahydrofuran ring)–$CH-CH_2-O-CH_2CH_2-O-COCH_3$ |
| Tetrahydrofurfuryl n-butyl ether of ethylene glycol | (tetrahydrofuran ring)–$CH-CH_2-O-CH_2CH_2-O-CH_2CH_2CH_2CH_3$ |
| Ethyl furoate | (furan ring)–$C-C(=O)-OC_2H_5$ |
| Tetrahydrofurfuryl acetate | (tetrahydrofuran ring)–$CH-CH_2OCOCH_3$ |
| Furfuryl | (furan ring)–$C-C(=O)-H$ |
| Furfuryl acetate | (furan ring)–$C-CH_2O-COCH_3$ |

| | |
|---|---|
| B-bromoethyl phenyl ether | 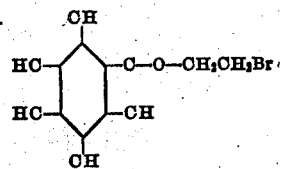 |
| p-chloro phenetole | 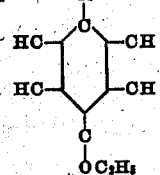 |
| p-fluoroanisole | 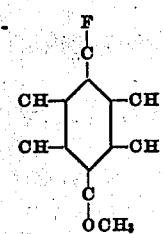 |
| Phenoxypropyl bromide | 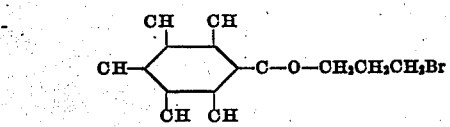 |
| p-bromophenetole | 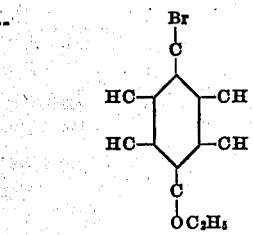 |
| Ethylene glycol mono-ethyl ether acetate |  |

Of course, one ether may be considered as better than others, but all those specified herein are commercially adaptable for producing refrigeration. Accordingly, I do not choose to differentiate between those herein listed.

Examination of the list will show that there is a wide variety of derivatives which suggest to those skilled in the art, certain substitutions or changes in the chains or groups which are attached to the essential ether structure $$\equiv C-O-C\equiv$$

It will be observed, for example that furfural itself has an ether group in its structure; that some compounds, such as diethylene glycol mono-butyl ether have two of the ether linkages; that others have three; and that still others have four. It is, therefore, to be understood that the essential character of compounds within this invention is not to be determined by the name, but by the structural formula representing the relation of elements in the compound. Note is made that a great number of names for a complex compound might be developed from a given structural formula. Some of these names may even hide the fact that there is an ether structure $$\equiv C-O-C\equiv$$

present in the formula.

An ether structure is essentially an organic oxide, and like metal oxides, these are quite stable compounds. I have found that the stability of the ether grouping $$\equiv C-O-C\equiv$$

is retained when the bonds to the ether carbons are attached to atoms from the list: carbon, oxygen and hydrogen. However, when a halogen atom is attached to one of the ether carbons the halogen derivative is active. Therefore, an ether such as dichloromethyl ($CH_2Cl.O.CH_2Cl$) is eliminated on the basis of structure. It is also eliminated because its physical characteristics lie outside of the field above defined.

It is to be noted that the compounds containing the said ether structure are not of any one specific organic class, and include groups selected from many types of organic compounds. These include cyclic compounds such as furfural; cyclic compounds containing an ester group, as furfuryl acetate, ethyl furoate, tetrahydrofurfuryl acetate; halogen derivatives of a simple compound, as dichloroisopropyl ether, dichloropropyl ether, dichloroethyl ether; an aliphatic-aromatic ether, with a halogen in the aliphatic chain, as bromo-ethyl phenyl ether, phenoxy propyl bromide; aliphatic-aromatic compounds with halogen on the aromatic nucleus, as bromophenetole, chlorophenetole, fluoroanisol; compounds containing an alcohol group, as in ethylene glycol mono-butyl ether, and diethylene glycol mono-butyl ether. Examination of the list above given shows how the groupings attached to the ether carbons may be altered without destroying the usefulness, when the properties still remain within the field above set forth.

It is to be noted that in claiming compounds having the ether structure, I do not intend to include all of them, but only those having the limitations herein described. I claim as my discovery that there is something inherent in the ether grouping

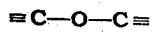

which makes this class of compounds successful as a solvent for methyl chloride, and that this is particularly true when the ether carbons are attached only to atoms from the list: carbon, hydrogen and oxygen.

The art recognizes that the mixture of solvent and refrigerant which is useful in a two-fluid absorption machine, is also useful in a three-fluid absorption machine in which an inert gas is a third ingredient which does not enter into a three-phase homogeneous mixture in any condition of operation of the machine. The function of the gas is pertinent to mechanical changes in the physical mechanism which operates on the refrigerant and solvent or the combination of refrigerant and solvent. Hence it is intended that the claims are directed to a refrigerant mixture broadly for absorption types of apparatus.

The applicant has disclosed the suitablity of several new solvents specifically for methyl chloride. This is a common example of a highly volatile refrigerant for which it is known that others may be substituted. It is therefore intended in the accompanying claims to set forth the new solvents as additions to the known lists of solvents, the additions being herein described members which are peculiarly adapted for the usage because of the presence of one or more characteristic ether groupings.

The present application is a continuation in part of my prior application, and is intended to be generic in character to my application Serial No. 687,045, filed August 28, 1933, now Patent No. 1,991,240, wherein I disclosed BB' dichloroethyl ether as a solvent for methyl chloride.

Applicant's copending application Serial No. 17,064, filed April 18, 1935, as a continuation in part of this case, is generic to subject matter herein disclosed.

The applicant's later copending application Serial No. 17,064, filed April 18, 1935, is generic to combinations here claimed with methyl chloride; and the applicant's copending application Serial No. 756,982, filed December 11, 1934, as a continuation in part of this application, is specific to the solvent dimethyl ether of triethylene glycol.

The applicant's copending application Serial No. 19,597, filed May 3, 1935, as a continuation in part of this application, is specific to the solvent ethylene glycol monoethyl ether acetate, and is generic to the combination of it with methyl chloride.

The applicant's later application Serial No. 756,981, filed December 11, 1934, as a continuation in part of this application as to the solvent tetrahydrofurfuryl acetate, is specific with respect thereto; and Serial No. 17,065, filed April 18, 1934, as a continuation in part of this case and of Serial No. 756,981, is generic to such solvent.

The applicant's later application Serial No. 19,598, filed May 3, 1935, as a continuation in part of this case, is generic to the combination involving tetrahydrofurfuryl ether of ethylene glycol acetate.

What I claim is:

A refrigeration mixture comprising as essential ingredients methyl chloride as a refrigerant and solvent selected from the group of alkyl ethers of the ethylene glycols consisting of ethylene glycol mono-butyl ether, diethylene glycol mono-butyl ether, acetate of mono-butyl ether of ethylene glycol, acetate of diethylene glycol mono-butyl ether, n-butyrate of the mono-n-butyl ether of ethylene glycol, methoxyacetate of the mono-n-butyl ether of ethylene glycol, diethylene glycol mono-butyl ether chloride, dimethyl ether of triethylene glycol, acetate of ethylene glycol mono-tetrahydrofurfuryl ether, tetrahydrofurfuryl n-butyl ether of ethylene glycol, and ethylene glycol mono-ethyl ether acetate.

GLENN F. ZELLHOEFER.